May 10, 1938.  R. F. DIRKES ET AL  2,117,241
TELEGRAPH PRINTER
Filed March 15, 1934  4 Sheets-Sheet 1

INVENTORS
R. F. DIRKES
E. R. WHEELER
V. R. KIMBALL
BY Eugene C. Brown
ATTORNEY

May 10, 1938.     R. F. DIRKES ET AL     2,117,241
TELEGRAPH PRINTER
Filed March 15, 1934     4 Sheets-Sheet 2
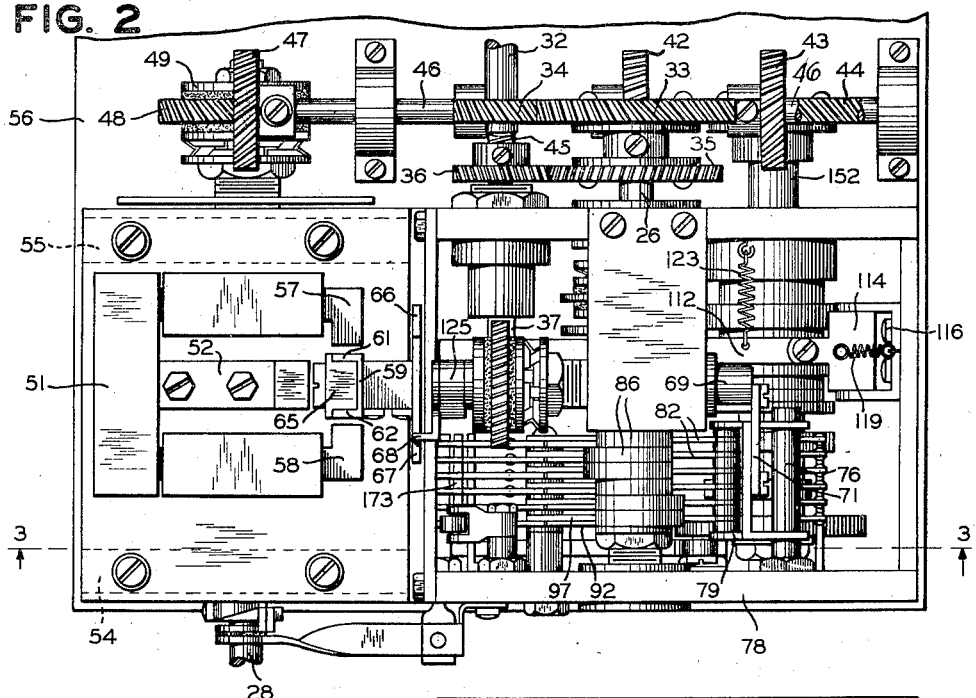

May 10, 1938.    R. F. DIRKES ET AL    2,117,241
TELEGRAPH PRINTER
Filed March 15, 1934    4 Sheets-Sheet 3

INVENTORS
R. F. DIRKES
E. R. WHEELER
V. R. KIMBALL
BY  Eugene C. Brown
ATTORNEY

May 10, 1938.　　R. F. DIRKES ET AL　　2,117,241
TELEGRAPH PRINTER
Filed March 15, 1934　　4 Sheets-Sheet 4
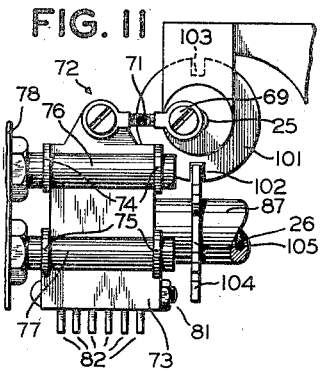
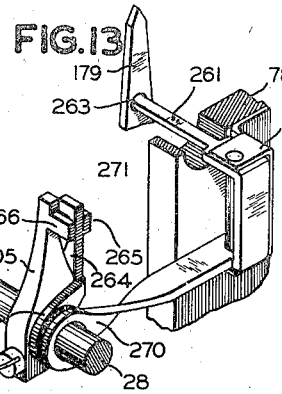
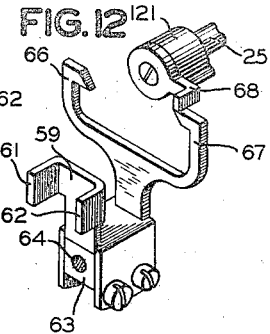
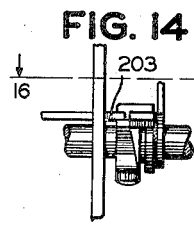
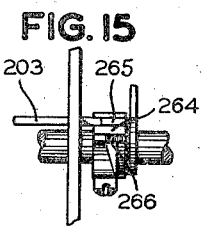
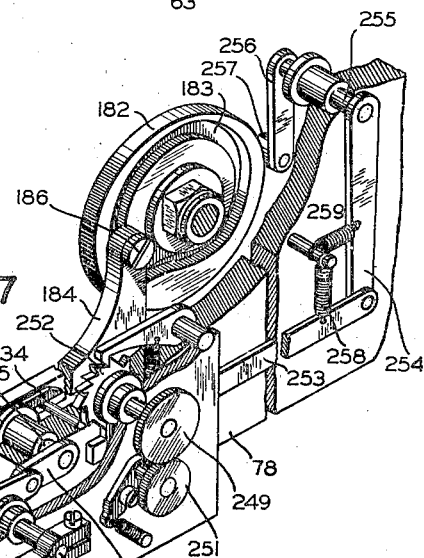
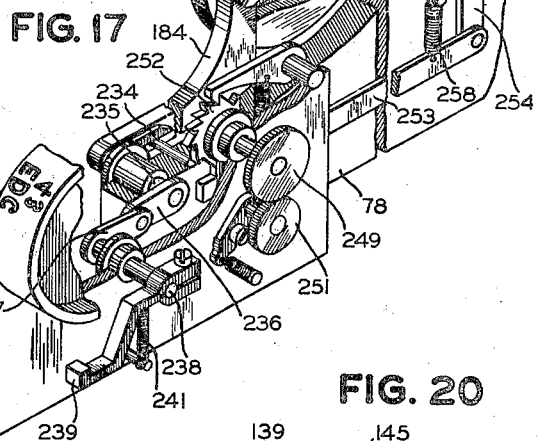
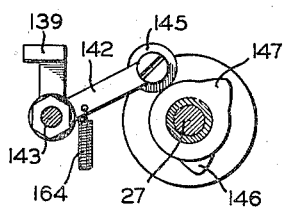
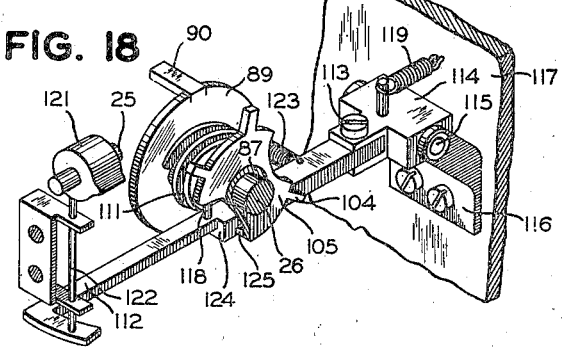
INVENTORS
R. F. DIRKES
E. R. WHEELER
V. R. KIMBALL
BY Eugene C. Brown
ATTORNEY Patented May 10, 1938

2,117,241

UNITED STATES PATENT OFFICE 2,117,241

TELEGRAPH PRINTER

Robert F. Dirkes, Jamaica, N. Y., and Evan R. Wheeler, Plainfield, and Vernon R. Kimball, Palisade Park, N. J., assignors to The Western Union Telegraph Company, New York, N. Y., a corporation of New York Application March 15, 1934, Serial No. 715,750

82 Claims. (Cl. 178—38)

The present invention relates to selecting and recording mechanisms and is especially suitable for a telegraph printer but the principles thereof may be equally well applied to a receiving perforator, a repeater for telegraph signals and to various other types of selective devices.

The invention is particularly concerned with a printer of the self synchronous type, that is, in which no means external to the printer is employed to maintain the printer in synchronous relation to the incoming signals, such as, for instance, the ordinary multiplex distributor.

More particularly it relates to a selecting and recording mechanism of the single magnet type. Printers of this type, as heretofore developed, have maintained synchronism with the incoming signals, by the use of special synchronizing impulses transmitted in definite relation to the selecting impulses. Ordinarily two such impulses are received, one of which permits the selector to come to rest following each character code group and the other of which restarts it in proper phase relation to the succeeding code group. Each character transmitted requires, therefore, either five or six selecting impulses and two synchronizing impulses, or a total of seven or eight line impulses. The synchronizing impulses consume about thirty percent of the line time for the five unit code and about twenty-five percent of the line time for the six unit code.

One of the objects of the present invention is to produce a selecting mechanism which will respond to permutation code signals and which requires no separate synchronizing impulses to maintain its synchronizing relation.

By the elimination of these control impulses, the rate of transmission over the line and consequently the number of characters per unit time received upon the printer may be increased, or for the same printer output the line frequency may be reduced, allowing greater margin on the printer and enabling satisfactory operation under more adverse line conditions.

In printers of the start-stop type, the interval occupied by the start and rest impulses is utilized to effect certain transfer operations and to recondition the selecting mechanism to respond to the succeeding group of selecting conditions.

Another one of the objects of the present invention is to enable the selecting mechanism to be conditioned to receive a succeeding group of character selecting impulses immediately upon the receipt of the last selecting impulses of the preceding character.

Another object is to produce a selecting mechanism which will respond to groups of selecting impulses received in continuous succession.

In the start-stop type of printer the selection is accomplished through the conjoined action of the line magnet and a rotating distributor shaft which is started and stopped for each character printed. In a printer operating at five hundred characters per minute, this shaft must be started, rotated a full revolution and brought to rest in one five hundredth of a minute. The distributor shaft performs a considerable amount of work and is relatively heavy. When rotating at full speed its momentum is considerable and the incessant and abrupt stopping thereof is objectionable both from the standpoint of wear and noise.

A still further object of the invention is therefore, to eliminate the frequent starting and stopping of the distributor shaft and to permit the same to rotate continuously, its rate of rotation being modified or checked only when it tends to lose synchronism with the incoming signals.

Another object is to provide a mechanical corrector for the distributor shaft, which is controlled entirely by the character selecting impulses.

Another object is to correct the selector shaft by reversals of the signaling impulses.

Since in the preferred embodiment of the invention the selector or distributor shaft is corrected only by the selecting impulses, it is obvious that if it should get out of phase with the incoming signals by a full impulse, it would remain out of phase. Consequently another object of the invention is to provide means for restoring the selector shaft to a unison position under control of line signals.

Another object is to produce a novel selector mechanism which is fast and certain in operation, which applies no appreciable load on the line magnet, and in which there are no idle movements of the elements of the selector.

Another object is to produce a novel overlap mechanism which provides substantially a full character overlap for the recording mechanism while permitting the selector elements to respond to successive groups of selecting impulses transmitted with no intervals therebetween.

Since the recording mechanism must complete its cycle in a period of five or six impulses as compared with seven or eight in printers employing start-stop synchronization, it is desirable to increase the time available for positioning the type carrying element relative to the time of reception of a complete character signal and the accomplishment of this purpose constitutes another object of the invention.

The recording mechanism in the preferred embodiment of the invention, is of the type employing a type wheel controlled by a series of notched code discs, having an annular row of stop bars, one of which is arranged to be positioned in the path of the type wheel stop arm, to determine the stopping position of the type wheel. In this type of recorder there has always been an appreciable interval between the release of the stop arm by the withdrawal of one stop bar, and the setting of the succeeding stop bar. If the succeeding stop bar is spaced near the preceding one, in the direction of rotation of the typewheel stop arm, the stop arm may, upon being released, rotate past the succeeding bar before it has been set. It is necessary therefore for the stop arm to rotate all the way around before finally engaging the stop bar. Since the time available for the type wheel to rotate into position, settle down and have an imprint taken therefrom is very limited, any unnecessary rotation of the wheel is undesirable.

Another one of the objects of the invention is to eliminate all unnecessary rotation of the type wheel. This is effected by retaining the type wheel in its last position until the positioning of the succeeding stop bar has been entirely completed. Consequently, even though the succeeding stop bar is next adjacent the preceding one, the type wheel stop arm upon release will be caught thereby.

The use of the six unit permutation code for operating telegraph printers, provides a total of sixty-four selections. Heretofore the recording mechanism for such a printer has employed a separate stop bar for each character or approximately sixty-four stop bars encircling the notched discs, or the characters have been arranged in two rows on the type wheel with a separate stop bar common to a character in each row or approximately thirty-two stop bars. A separate shift mechanism must be provided in the latter case for shifting either the type wheel or otherwise determining from which row printing is to be effected. The provision of sixty-four stop bars is undesirable since it crowds the bars, necessitates the use of large discs and adds a considerable extra load to the selector, all of which tend to decrease the speed of operation of the printer. The use of a separate type wheel shift is also undesirable, particularly in page printers, since it complicates the movements of the type wheel and increases the size and weight of the type wheel carriage, which must be moved across the page.

Therefore, we have for another object to avoid the objections of both of these schemes and to enable the type wheel to be set in any number of different angular positions under the control of a lesser number of stop bars. In the embodiment shown, each stop bar determines two different angular positions of the type wheel, although it will be obvious from the detailed description of the invention that each stop bar might control a greater number of printing positions.

Other general objects of the invention are to increase the speed and reliability of the recorder, and to simplify its construction and render it adaptable for either tape or page operation.

Still other objects and advantages of the invention will appear from a detailed description of the accompanying drawings, showing a preferred embodiment thereof, and in which:

Fig. 2 is a plan view of the printer;

Fig. 3 is a sectional view thereof approximately on the line 3—3 of Fig. 2;

Figure 8:
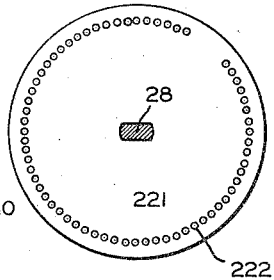
Fig. 8 illustrates the locking disk for retaining the type wheel at rest during a transfer operation.
Figure 9:
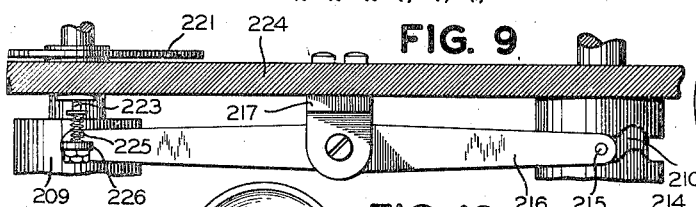
Figure 10:
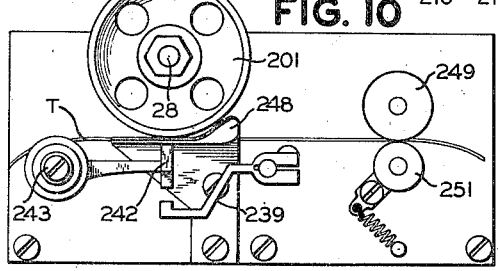

Fig. 9 discloses the locking mechanism which cooperates with the locking disk of Fig. 8;

Fig. 10 is an elevation of the type wheel and press mechanism;

Fig. 11 is an end view of the escapement shaft as viewed on the line 11—11 of Fig. 3;

Fig. 12 is an isometric view of the escapement mechanism;

Fig. 13 is an isometric view of the type wheel stop arm assembly;

Fig. 14 is a plan view of the type wheel stop arm in one position of operation;

Fig. 15 is a plan view of the type wheel stop arm in an alternate position of operation;

Fig. 16 is an elevation of the type wheel stop arm viewed approximately along the line 16—16 of Fig. 14.

Figure 4:
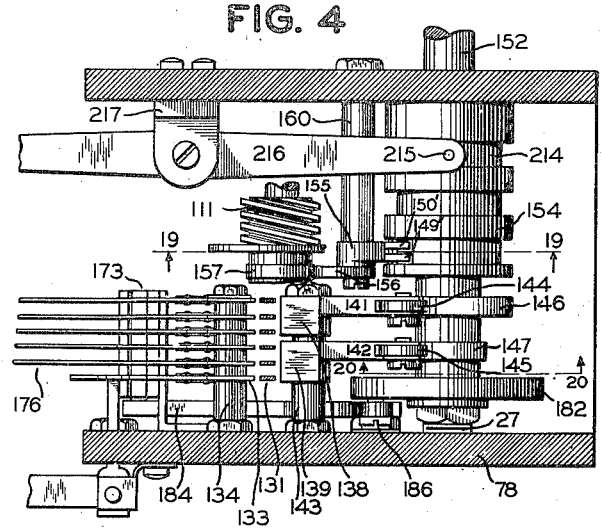
Fig. 4 is a detailed view of the operating cam and main transfer mechanism taken substantially on the line 4—4 of Fig. 3.
Figure 5:
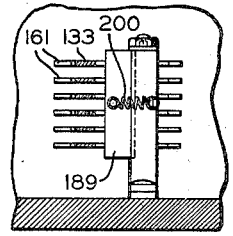
Fig. 5 is an elevation of the locking latches for the main transfer mechanism viewed on the line 5—5 of Fig. 3.

Fig. 17 is an isometric view of the press and tape feed mechanism;

Fig. 18 is an isometric view of the unison mechanism;

Fig. 19 is a sectional view of the operating cam clutch and trip off mechanism taken in line 19—19 of Fig. 4;

Fig. 20 is a sectional view of the transfer cam taken on the line 20—20 of Fig. 4.

Referring first to Fig. 3, the operation of the selecting and recording mechanism is effected through four rotatable shafts, namely the escapement or synchronizing shaft 25, the selecting cam shaft 26, the operating cam shaft 27, and the type wheel shaft 28. These shafts are driven by a common motor 29 (Fig. 1) maintained at the correct speed by any suitable regulator 31. The motor shaft 32 carries a gear 34 meshing with a gear 45 on a transverse shaft 46. The shaft 46 carries the gears 41, 42 and 43.

The selecting cam shaft 26 is driven from the shaft 46 through a spiral gear 33, meshing with a similar gear 42 on the shaft 46.

The escapement shaft 25 is driven through gear 35 (Fig. 2) on the selecting shaft 26 which meshes with a gear 36 carried by a counter shaft 37. The shaft 37 in turn has a gear 38 (Fig. 3) thereon (34) engaging with gear 39 loosely mounted on the synchronizing shaft 25 and connected thereto through the friction clutch 41.

The operating cam shaft 27 is driven from the shaft 46 by a gear 43 thereon which engages a gear 44 on the operating cam shaft 27.

The type wheel shaft 28 is driven from the shaft 46 by a gear 47 thereon meshing with a gear 48 loosely mounted on the type wheel shaft 28 and serving to drive the same through a friction clutch 49.

*Selecting mechanism*

The printer is controlled by a single polarized magnet 51 carried by a bracket 52 mounted on a plate 53 extending across two upright plates 54 and 55 in turn secured to the base 56. Magnet 51 has a pair of opposed pole faces 57 and 58 between which the armature 59 operates. The armature 59, best shown in Fig. 12, is of U-shape, the outwardly turned arms 61 and 62 of which form the working faces of the armature. The armature is secured to a block 63 pivoted by a pin 64 to a post 65 (Figs. 2 and 3) extending upwardly from the plate 53.

Also secured to the block 63, and preferably integral with the armature 59, is a pair of escapement pallets 66 and 67 arranged to alternately engage an offset escapement arm 68 rigidly secured to the synchronizing shaft 25. The shaft 25, it will be recalled, is driven through a friction clutch 41 from the gear 39 loosely mounted thereon. The shaft is normally held at rest, however, by engagement of the escapement arm 68 with one or the other of the pallets 66 or 67. Each time a line reversal occurs the armature 59 is moved against the opposite pole face rocking the pallets 66 and 67 and thereby escaping the arm 68 into engagement with the opposite pallet. Consequently on each reversal of line signals the shaft 25 is escaped for half a revolution. It may be considered therefore as having two positions of operation, a marking position and a spacing position disposed 180° apart.

The shaft 25 at the opposite end from the escapement 68 has a crank 69 mounted thereon (best shown in Fig. 11) having a connecting rod 71 arranged to operate a shuttle 72. The shuttle 72 comprises a plate 73 having two pairs 74 and 75 of rearwardly extending apertured guide lugs by which the shuttle is guided for longitudinal movement upon two pins 76 and 77 respectively, extending outwardly from the vertical frame plate 78. The shuttle plate 73 also has a pair of lugs 79 extending forwardly from the lower end thereof between which a pivot pin 81 extends on which are pivoted a set of six spaced interponent members or hammers 82. The hammers 82 are normally forced upwardly against a stop pin 83 by individual springs 84. The upper face of each hammer is bevelled at 85 and the bevelled faces are disposed in the path of and directly beneath each of the selecting cams 86, mounted upon the selecting shaft 26 in angularly spaced relation. The shuttle 72 is shifted back and forth on the guide pins 76 and 77 by the crank 69 as reversals of signals occur. It is thus shifted to the left or to marking position as shown in Fig. 11 upon reception of a marking impulse and is moved to the right into spacing position whenever a spacing signal is received. The hammers 82 are considerably narrower than the cam faces 86, however, so that they will be invariably engaged in both marking and spacing positions by the cams, as they revolve.

The cams 86 are carried by a sleeve 87 loosely mounted on the shaft 26 and driven therefrom through a slip clutch 88 (Fig. 1) through a disk 89 having spaced fingers 90 engaging in slots in the driven clutch disk 91. It will be understood that the cams 86 rotate in synchronism with the received impulses so that each cam engages its associated hammer 82 and depresses it during the reception of a definite signal impulse. Extending beneath the hammers 82 is a set of six spaced selecting levers 92 pivoted on a pin 93 extending outwardly from the frame plate 78. A set of six latches 94 pivoted on a pin 95 is provided, one latch being individual to each of the levers 92.

The latches 94 are normally urged towards the outer ends of the levers 92 by individual springs 96. Individual springs 98 also bias the levers 92 upwardly. Each latch has an extension 97 offset therefrom longitudinally of the pin 95 so that the outer ends of the latch extensions are disposed between the spaced levers 92 and immediately beneath the hammers 82. The relation of the selecting levers 92 and latch extensions 97 is such that the hammers 82 in the marking position of shuttle 72 engage the levers 92 when depressed by the selecting cams and when the shuttle is in spacing position the hammers engage the latch extensions 97 when depressed. It will be obvious therefore that as the cam 86 rotates during the reception of a group of mixed marking and spacing conditions that the shuttle 72 will shift back and forth as reversal from marking to spacing or from spacing to marking occur, positioning the hammers above either the levers 92 or the latch extensions 97 so as to depress one or the other thereof depending upon whether a marking or spacing signal is being received.

The levers 92 when depressed are held in their lower positions by the latches 94. They retain this position until unlatched in response to a succeeding spacing condition. Therefore, regardless of what position the selecting levers 92 may be in as a result of a preceding selection, they will be positioned in either a downward latched position or an upward unlatched position in accordance with the marking and spacing conditions respectively of each code group received.

Before proceeding with the description of the recording mechanism, which is selectively operated in accordance with the levers 92, a description will be given of the mechanism for maintaining the selecting cams 86 in synchronism with the received impulses.

Correcting apparatus

The present selector differs from that used in the start-stop printers in that the selecting cams do not come to rest following each character selection but operate continuously, being corrected from time to time as required to maintain the cams in synchronism with the received impulses. The correction is effected on the principle of the multiplex correction, that is, by reversals occurring in the line signals, but it differs from the usual multiplex corrector in effecting a correction for every reversal instead of for only reversals from marking to spacing. By thus using the cross over from one line condition to another to control the correction no special synchronizing or start-stop impulses are required. Accordingly only character selecting impulses are transmitted over the line, these being received in continuous succession, that is, without any interval between successive groups of character signals. This effects a saving of from 25 to 30% in line time, enabling the printer to operate at a correspondingly higher rate. It also enables the recorder to be operated more readily from multiplex signals over extended channels since it is unnecessary to insert the start and stop impulses therein as in the present practice.

The selecting cams 86 are preferably rotated slightly faster than the received signals in order that the correction may always be effected by retarding the cams, but, of course, the correction may be made in a forward direction as well as in a backward one, in which case the cams would be rotated as closely as possible to synchronous speed. In the present embodiment, however, we have shown the correction effected in one direction only through the following mechanism.

Mounted on the synchronizing shaft 25 is a disk 101 (Figures 1, 3 and 11) having a pair of diametrically opposite radial slots 102 and 103. The disk 101 extends into the path of a series of radial fingers 104 extending outwardly from a disk 105 rigidly mounted upon the cam sleeve 87 to rotate therewith. Normally one of the slots 102 or 103 is disposed in alinement with the fingers 104 so that they may pass therethrough permitting the disk and the selecting cams to rotate freely. Whenever a reversal occurs in the signals to escape the shaft 25 for half a revolution the opposite slot 102 or 103 is moved into alinement with the fingers 104. If the disk 105 and consequently cams 86 are rotating in proper phase relation with the incoming signals one of the fingers 104 passes through the slot 102 or 103 just preceding a reversal. The disk 101 when escaped for half a revolution rotates at a sufficiently fast rate to position the opposite slot thereof in alinement with the succeeding finger just as the finger approaches the disk. Consequently it is permitted to pass through the slot and the cams are unretarded. However, if the cams have crept forward slightly relative to the signals, which is the usual direction of creep, since the cams are operated slightly faster than the signals, the disk 101 will not have completed its rotation into position, following a reversal, in time to permit the free passage of the next finger 104, and the approaching finger will engage the imperforated portion of the disk between the slots, thereby checking the rotation of the cams until the slot becomes alined with the finger, at which time it will pass therethrough. The retardation of the cams is sufficient to restore them into proper phase relation with the incoming signals.

It will be noted therefore that a correction, if needed, will be applied for every reversal regardless of whether from marking to spacing or from spacing to marking. These corrections may occur as often as six times for a single character code group (assuming the six unit code is employed) or it may not occur for several character code groups, depending on the number of reversals occurring in each signal group and the rate of creepage of the cam relative to the signals.

If the line should be idle with either marking or spacing battery continuously applied thereto one of the slots 102 or 103 would be continuously positioned in the path of the fingers 104 and the cams would rotate continuously, causing unnecessary operations of the selector and causing the cams to gradually lose synchronism. In order to prevent this we have provided a unison mechanism for the selector which will now be described.

*Unison mechanism*

Figure 1:
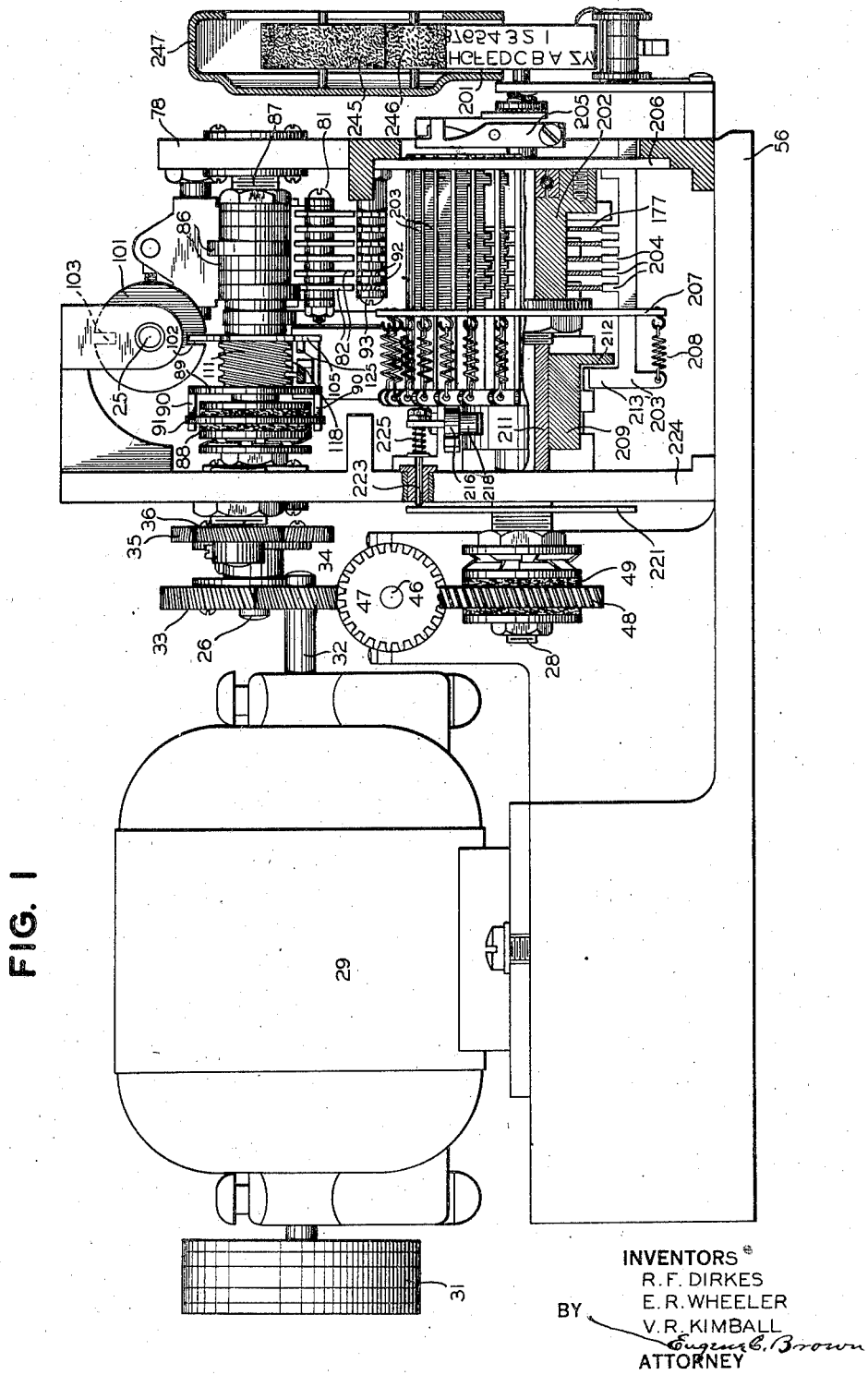
Fig. 1 is a side elevation partly in section of a printer embodying the present invention.

Rigidly secured on the cam sleeve 87 is a worm 111 (Figures 1 and 18). Disposed beneath the worm is a lever 112 pivoted on a vertical pin 113 to a block 114 which in turn is pivoted on a horizontal pin 115 to a bracket 116 secured to the frame plate 117. A pin 118 extends upwardly from the lever 112 into the path of the worm 111. It is normally held in its upward position by a spring 119. It is adapted to be moved out of contact with the worm 111, however, on each revolution of the shaft 25 by means of a cam 121 mounted on the shaft 25, which engages a pin 122 to depress the same against the outer end of the lever 112, once each time the shaft 25 revolves. Whenever the lever 112 is depressed it is drawn to the left hand side of the worm 111 by a spring 123. The cam 121 is positioned on the shaft 25 so that in its rest position the lever 112 is elevated to bring the pin 118 into mesh with the worm. Consequently when a steady line condition continues for a predetermined length of time the pin 118 travels to the right along the worm swinging the lever 112 about its pivot 113 until a shoulder 124 formed on the lever 112 is moved into the path of an inwardly extending projection 125 formed on the disk 105. When this occurs the disk is brought to rest with the extension 125 in contact with the shoulder 124 and the cams 86 are thereby stopped in their normal position, that is, so that upon the resumption of signals the No. 1 cam will first engage the No. 1 selector lever. The cams will remain at rest as long as no reversals occur. However, when it is desired to resume signaling over the line, a unison or release combination must precede the signals. The unison signal may be any combination in which the first impulse is of opposite polarity from the steady line condition, which causes the cam shaft to come to rest. Preferably steady marking battery is employed to cause the selector to run to unison and the unison release signal has the first impulse spacing. The reversal from marking to spacing releases the pin 118 from the worm 111 and permits the lever 112 to be moved to the left by spring 123, thereby releasing the disk 105 for rotation again in phase with the unison release signals. The regular intelligence signals may then follow in continuous succession. The unison release signal may be deleted in the printer, so as not to cause operation of the press and tape feed mechanism in any of the ways commonly employed for deleting the rub-out signal. Of course, it is not necessary to stop the selector cam shaft with the No. 1 cam approaching selecting position, it only being necessary that the first reversal in the unison release signal correspond to the stopped position of the cam shaft. If the No. 3 cam is the first to reach selecting position on resumption of operation, then the third impulse must be the first reversal.

During normal signalling periods the lever 112 never reaches the extreme right side of the cam since it is moved out of contact therewith and restored to its left hand position for every reversal from marking to spacing position of shaft 25. Preferably the time required to move the lever from its left hand to its right hand position should occupy a period of several characters.

The unison mechanism is useful not only to bring the cams to rest upon interruption of signals but to restore the selector to unison at predetermined intervals throughout active signalling periods. Since the selector shaft rotates continuously and does not discriminate between the various impulses of a code group, should it for any reason get out of phase with the signals it could not be restored in the absence of the unison mechanism. By restoring the selector to unison at intervals any loss of phase will be corrected.

It will be noted that the mechanism so far described permits the selecting levers 92 to be selected in accordance with character code signals received in continuous succession, the cam shaft being maintained in proper phase relation and in synchronism with the signals without the use of special synchronizing impulses, means being provided for insuring the starting of the cams in proper phase relation, and the restoration thereof into such relation, should this be required.

In order to operate the recorder by signals received in continuous succession it is necessary to provide suitable overlap mechanism. The interval available for operating the recorder is materially less in the present printer than in the start-stop type since the start and stop impulses provide additional time for operation of the printing mechanism. In order to provide the necessary overlap to enable the recorder to print signals received in such continuous succession we have provided a double overlap mechanism, comprising a preliminary transfer mechanism and a final or main transfer mechanism. The preliminary transfer may occur in a number of successive stages, (two in the present embodiment) and preposes a secondary group of selectors for operation by the main transfer mechanism.

Preliminary transfer

Depending from each of the levers 92 is an interponent member 131 (Fig. 3) guided in a comb 132. Pivoted in advance of the interponents 131 on a stud shaft 134 is a set of six secondary selector levers 133. The interponent members 131 are normally urged to the right by individual springs 135 and the secondary selector levers 133 are likewise normally urged to the right by individual springs 136.

Figure 6:
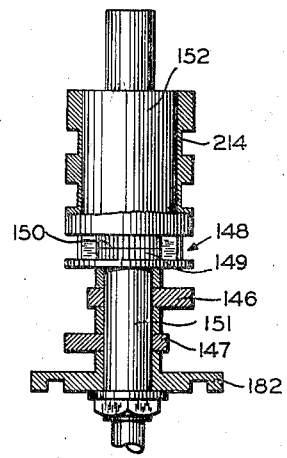
Fig. 6 is a sectional view of the operating cam shown in Fig. 4.

As each of the selecting levers 92 is depressed in response to a marking signal, its interponent 131 is lowered into position opposite the lug 137 extending rearwardly from the corresponding secondary selector lever 133. Disposed to the right of the interponents 131 is a pair of operating bails 138 and 139 (Figs. 3, 4 and 20). Each of the bails 138 and 139 spans three of the interponents 131. These bails are carried by bell crank levers 141 and 142 respectively pivoted on a stud 143. The rearward extensions of the levers 141 and 142 are provided with rollers 144 and 145 engaging the cams 146 and 147 respectively mounted upon the operating cam shaft 27. The cams 146 and 147 are normally at rest, in which position they may be held by a jockey, not shown, but are arranged to be driven at predetermined times through a ratchet clutch 148. The clutch 148 comprises two ratchet wheels 149, 150, (Figs. 6 and 19) rigid on shaft 27, and arranged so that the teeth of one ratchet alternate with the teeth of the other. A sleeve 151 loosely surrounds the shaft 27 and has mounted thereon the cams 146, 147 and 182. A housing 152 rigid on sleeve 151, surrounds the ratchet wheels and has an opening therein through which the pawls 149' and 150' extend. These pawls are urged into engagement with the continuously rotating ratchet wheels by individual springs 153, but are normally held out of engagement therewith by a lever 155, as shown in Figure 19. The lever 155 is mounted on a stud 160 and has an upwardly extending arm 156 extending into engagement with a cam 157 mounted on the selector cam sleeve 87. The lever 155 is held against the cam 157 by a spring 158 and normally latches the pawls 153 out of engagement with the ratchet wheels 148 and 149. However, at a predetermined point in a cycle of operation of the selector cam, the trip-off cam 157 rocks the lever 155 to disengage the pawls 153 and permit their springs 153 to move them into engagement with the ratchet wheels 149 and 150, locking the same together. The cams 146 and 147 are thereby rotated through one revolution at the end of which the pawls 149, 150 are tripped out of engagement with the ratchet wheels by engaging the lower end of lever 155. Preferably trip lever 155 is actuated following the second received impulse of a selecting group.

The cams 146 and 147 are adjusted on the sleeve 152 so that the raised portion of cam 146 engages the roller 144 to rock the transfer bail 138 during the reception of the fifth impulse. At this time the first three selecting bars 92 are fully positioned in accordance with the first three selecting conditions of a code group. Consequently as the bail 138 is rocked forward it engages such of the first three interponents 131 as have been lowered, forcing them against the corresponding secondary selector levers 133 and swinging them to the left in which position they are latched by individual latches 161, urged upwardly by individual springs 163. As soon as the setting of the first three selecting levers 92 has been transferred to the corresponding transfer levers 133, the operating bail 138 is moved backwardly by a spring not shown, but corresponding to spring 164 of lever 142, thereby reconditioning the first three selecting levers to respond to the proper impulses of the succeeding signal. This transfer is substantially completed during the reception of the fifth impulse.

Immediately following the sixth impulse, that is during the reception of the first impulse of the succeeding signal, the operating cam 147 operates to force the transfer bail 139 to the left, thereby transferring the setting of the remaining selectors 92 to the remaining secondary selector levers 133. This transfer is entirely completed during the first impulse. It will be noted, therefore, that by providing a two-step transfer, the signal conditions stored in the first selectors 92 will always be transferred to the secondary selector levers and each of the first selecting levers thereby conditioned to respond to correct impulses of the succeeding code group before such impulses are received. The selectors 92, therefore, may be operated by a continuous succession of impulses forming successive characters.

The complete code now being stored in the secondary selector levers 133, it is necessary to retransfer it immediately on to the type wheel selector in order to restore the secondary selector levers so that they may receive the next signal group from the primary selecting levers 92.

Main transfer

Each transfer lever 133 has a horizontal interponent bar 171 pivoted thereto and resting in a comb 172. The first five of the interponents 171 are plain and terminate just to the right of the main transfer bail 173. The last of the interponents 171' has two upwardly extending spaced lugs 174 and 175 on its outer end. Disposed above the first five interponents are five levers 176 rigidly secured to a set of five notched code disks 177 normally urged in a clockwise direction by individual springs 178. Above the interponent 171' is a sword 179 pivoted at 181 and having a forked lower end disposed above the interponent member 171'.

A disk 182 having internal cam track 183 is mounted on the sleeve 151 to rotate with the cams 146 and 147. A bell crank lever 184, pivoted to 185 has a pin 186 extending into the track 183. The transfer bail 173 is pivoted at the opposite end of the bell crank lever. Consequently as the cam disk 182 rotates, the lever 184 is rocked to force the transfer bail 173 upwardly. It is of sufficient width to span all of the interponents 171 and 171' and engages such of these interponents as have been advanced to the left, forcing them upwardly. The first five interponents, if selected, operate the disks 177 into a marking position. The sixth interponent positions one of the legs 174 or 175 beneath one or the other of the forked arms of the sword 179 and rock the sword either one way or the other depending upon the position of the interponent. The disks 177 are locked following their selection as will hereinafter appear. The sword 179 is locked in either operated position by a detent 187.

The cam 182 is orientated relative to the cams 146 and 147 so that it effects the second or main transfer immediately following the operation of the transfer 139, being completed mainly during the time of reception of the second impulse of each received signal. As the lever 184 rocks in a clockwise direction to raise the operating member 173, an unlatching pawl 188 carried thereby is raised above a plate 189 disposed above the latches 161. The unlatching pawl 188 is hooked over the top of the plate by the action of the spring 190 and on the downward movement of the pawl it rocks each of the operated latches 161 downwardly, thereby releasing them from engagement with the secondary selector levers 133 which thereupon move to their right hand positions under the action of springs 136. As the lever 184 approaches its lower position a fixed pin 191 engages the cam surface 192 of the unlatching pawl 188 and releases it from the plate 189. The plate 189 is restored to its upward position by a spring 200.

The operation of the second step of the preliminary transfer, the operation of the main transfer and the restoring of all of the levers 133 is completed before the end of the third impulse of the succeeding signal group. Consequently the secondary selector levers 133 are free to be reset during the next cycle of operation of the transfer cams 146 and 147.

Type wheel selector

The type wheel 201 is rigidly mounted on the shaft 28 and disposed about this shaft is the series of five code disks 177 (Figures 1 and 3). These disks are mounted on a sleeve 202 for limited rotative movement. Surrounding the disks 177 is a group of thirty-two stop bars 203 mounted to slide axially of the discs. Each bar is provided with five radial fingers 204 extending inwardly and normally disposed between the code discs. Whenever the discs are operated in accordance with a received code combination, a row of notches on the periphery thereof will be aligned with the fingers 204 of one of the stop bars, thereby permitting the selected stop bar to move axially of the discs into the position shown by the bar 203' in Figure 1. In this position the right end of the bar is disposed in the path of a stop arm 205 carried by the type wheel shaft. The bars 203 are guided at their outer ends in an apertured plate 206 and at their inner ends in an annular comb 207, the inner periphery of which is slotted. The bars 203 are urged to the right by individual springs 208.

A collar 209 is slidably mounted on a fixed sleeve 211 concentric with the type wheel shaft, and has a flange 212 behind which the radial ends 213 of the bars 203 are disposed. When the collar 211 is moved to the left, the collar 212 engages the ends 213 of the stop bars withdrawing the operated one of these bars from the slots of the disks and when the collar is returned to the right, it releases all of the stop bars and permits a selected one thereof to move into the aligned notches of the code disks.

The reciprocating movement of the collar 211 is affected in proper timed relation to the main transfer previously described by a cam 214 (Figures 4 and 9) mounted on the housing 152. The cam 214 has a circumferential track with a radial recess 210 in which a pin 215 carried by a lever 216 engages. The lever 216 is pivoted to a bracket 217 midway of its length and the opposite end thereof has a second pin 218 (Figure 1) engaging in a recess in the top of the collar 209. Consequently as the lever 216 is rocked by rotation of the cam 214, the collar 209 is first moved to the left, as viewed in Figure 1, and then restored to the right. The movement to the left occurs just preceding the upward movement of the transfer bail 173 of the main transfer, thereby removing the operated stop bar from the disks and thus unlocking them so that they may be shifted during the movement of the transfer bail. As soon as the disks have been reset by the transfer operation and before the bail 173 is lowered, the cam 214 returns the collar 209 to the right, permitting one of the stop bars to enter the aligned notches of the disk and thereby locking them in their set position. The entire resetting operation of the stop bars occurs during the main transfer which takes place during the first and second impulses of the succeeding code signal. Therefore at the end of the second impulse of the succeeding code, one of the stop bars has been positioned in accordance with the selected conditions of the preceding code.

Type wheel locking mechanism

The type wheel 201 is continuously urged to rotate through the friction clutch 49, its movement being opposed by engagement of the stop arm 205 with one of the stop bars 203. Consequently as soon as a new stop bar is positioned, the type wheel may be released from its previous position and allowed to rotate into engagement with the newly positioned bar. In previous printers of this type the type wheel is released immediately upon removal of one stop bar and is allowed to rotate during the period required to position another stop bar. However, in order to give the type wheel the maximum time in which to rotate into its next position and to take an impression therefrom, we prefer to lock the type wheel stationary during the resetting operation, releasing it only after the newly selected bar has been completely positioned in the path of the stop arm. This allows a full period of six impulses for rotating the type wheel into printing position and for operating the press mechanism. In our preferred embodiment the type wheel is released coincidentally with the setting of the stop bar and the press is operated just preceding the completion of the setting of the succeeding stop bar, that is, during the actual setting operation of the succeeding stop bar. This gives the type wheel the period of five full impulses in which to rotate into position and settle down before the press is operated.

The mechanism for indexing and locking the type wheel during the positioning of a succeeding stop bar comprises a disk 221 (Figures 1 and 8) carried by the type wheel shaft 28. The disk has a series of 64 locking and indexing apertures 222 therein. A locking and indexing pin 223 extends through the frame plate to 224 into alinement with the row of openings 222. The pin 223 passes loosely through an opening in the upturned ear 226 of lever 216 and is provided with an adjusting nut 220 normally held in contact with the ear by a pressure spring 225 interposed between the ear 226 and a collar 219 on the pin. The spring 225 urges the pin towards the indexing disk 221 so that as the lever 216 is rocked to withdraw the operated type wheel stop bar to the left (Figure 1) out of engagement with the type wheel stop arm, the pin 223 is forced to the left into one of the perforations of the disk 21, corresponding to the angular position in which the type wheel is stopped.

The end of the pin 223 is beveled so that it enters the selected aperture of the disk even though slightly out of alinement therewith, thereby accurately indexing and locking the disk and consequently the type wheel during the printing stroke which occurs immediately after the foregoing operation has been completed. Since this indexing operation occurs just before the resetting of the code disks 177 in accordance with a new combination, the type wheel will have a maximum length of time to settle down and come to a complete rest before the indexing operation occurs. The spring 225 enables the pin 223 to complete its indexing stroke and thereby to lock the type wheel against movement before the lever 216 has fully withdrawn the previously selected stop bar from engagement with the type wheel and upon the return movement of the lever 216 to set the succeeding stop bar the pin 223 will remain in locking contact with the disk until the new stop bar has moved into the path of the type wheel stop bar. Consequently the type wheel is not released for movement until the new stop bar has been positioned.

As the lever 216 moves to the right to set the succeeding stop bar the pin 223 is withdrawn from the locking disk by engagement of the upturned ear 226 of lever 216 with the locking nut 220, again releasing the type wheel for movement.

It will be noted that the type wheel is definitely held stationary in properly indexed position during the stop bar resetting period and during this interval the press mechanism is operated.

Case control mechanism

It will be noted that the characters are disposed on the type wheel in two rows with the characters of one row alternating with those of the other, so that if there are thirty-two characters in each row, the type wheel will have sixty-four angular printing positions. Since only thirty-two stop bars are employed, it is necessary to have each stop bar control the stopping of the type wheel in either one of two angular positions, selectively. The first five impulses control the setting of the code disks and the selection of one of the thirty-two stop bars. The sixth impulse is used to determine in which of two angular positions the type wheel will stop. Referring again to Figure 3, it will be recalled that the sword 179 was actuated into one of two positions in response to the sixth impulse received, being locked in either set position by the detent 187. Referring now to Figure 13, it will be seen that a lever 261 pivoted to a bracket 262 mounted upon the plate 78 has one end extending through an aperture 263 in the sword 179 and the opposite end extending at right angles and encircling the type wheel shaft 28. Mounted upon main stop arm 205 is an auxiliary stop member 264 having its upper end guided between a pair of lugs 265 and 266, extended outwardly from the stop arm 205. The auxiliary stop member 264 is pivoted to the main stop arm 205 at 267, and its upper end is urged to the right as viewed in Figure 16, by a spring 268. It has a flange 269 encircling the shaft 28 in position to be engaged by the extended end 270 of the lever 261 so that as the sword 179 swings one way or the other, the upper end of the auxiliary stop arm is rocked in front or away from the main stop arm 205. When the auxiliary stop arm is moved away from the main stop arm, which is the position shown in Figures 13 and 14, the surface of the main stop arm engages the end of the stop bar 203. But when the auxiliary stop arm 264 is moved toward the main stop arm, the upper end thereof slides in front of the main stop arm 205 and forms the engaging face with the stop bar (Fig. 15). The type wheel shaft therefore is stopped in either of two angular positions depending upon whether the auxiliary arm is moved towards or away from the main stop arm. The thickness of the upper end of the auxiliary stop arm is sufficient to vary the angular position of the type wheel an amount alloted to each adjacent character. The combined thickness of the outer ends of the two stop bars must be less, however, than the distance between the two stop bars so that should adjacent stop bars be selected, the outer movement of the succeeding one will not be opposed by either of the stop arms. The stop arms rotate clockwise as viewed in Figure 13.

It will be noted, therefore, that we are able to select sixty-four separate printing positions on the type wheel without the use of any type wheel or platen shift mechanism and at the same time require only thirty-two separate stop bars. This enables the size of the code disk selector to be made relatively small and enhances rapid operation. While we have shown the characters on the type wheel arranged in two rows, it is obvious that they might be arranged in a single row. This would be preferable, of course for page operation since it would not necessitate the actual shifting of the type wheel to print figure and letter characters in one line. However, for quotation ticker service wherein the characters are printed in offset relation, it is preferable to employ two rows of characters, thereby eliminating any shifting of the type wheel or of the tape. It is also obvious that letters and figures can be indiscriminately mixed on either row of the type wheel or disposed in any angular position around the type wheel merely by modifying the code combinations employed for selecting the various characters. For instance, the letters A and B might be disposed in adjacent angular positions, the character A being selected by a combination in which the sixth impulse is marking and the letter B by the same combination in which the sixth impulse is spacing.

Press operation

The press is controlled from the bell crank lever 184 (Figure 3) during the main transfer. For this purpose an arm 231 is mounted upon the lever 184 and normally urged downwardly by a flat spring 232. A lip 233 on the arm 231 lies over the top of the lever 184 and the free end of the arm 231 lies under a rock arm 234 carried by a shaft 235 (Fig. 17) extending through and bearing in the frame plate 78. At the outside of the plate 78 the shaft 235 carries a crank arm 236, connected by a slot and pin to the outer end of an arm 237 rigid on the shaft 238 which in turn carries the press hammer 239. The hammer 239 is normally held away from the type wheel by a spring 241 but upon upward movement of the lever 184, the arm 231 engages the rocker arm 234, rocking levers 236 and 237 and forcing the hammer 239 upward towards the type wheel. As shown in Fig. 10, a platen 242 pivoted at 243 is interposed between the hammer 239 and the type wheel 201. Upward movement of the hammer 239 forces the platen 242 against the tape T thereby to produce an impression from the type wheel.

On continued upward movement of the bell crank lever 184, the arm 231 slides past the crank arm 234 thereby allowing the hammer 239 to return to its lowered position and insuring a quick sharp impression. On the downward movement of the lever 184, the beveled under surface of the arm 231 slides over the inclined face of the arm 234, due to flection of the spring 232, again positioning the arm 231 below the crank arm 234. The downward movement of the crank arm is restricted by a stop pin 244.

The type wheel is inked from a felt inking roller 245 (Fig. 1) through an intermediate roller 246 which bears directly on the type wheel. The rollers 245 and 246 are carried in vertical slots (not shown) in the casing 247, and rest by gravity on the type wheel. The intermediate roller 246 is preferably of a porous rubbery nature since it has been found that this material properly conveys the ink from the pad 245 and at the same time eliminates wear of the type wheel characters.

*Paper feed mechanism*

The tape is fed from the right under a tape guard 248 (Fig. 10) beneath the type wheel by a knurled feed roller 249. The tape is held in contact with the roller 249 by a pressure roller 251 in the usual manner. The roller 249 is actuated, as best shown in Figure 17, by a ratchet 252, operated by a pawl 253, reciprocated by a crank arm 254 secured to a shaft 255 extending through the plate 78 and having on its inner end a second arm 256 provided with a roller 257 which engages the outer surface of the cam disc 182. The pawl 253 is held upwardly in engagement with the teeth of the ratchet wheel by a spring 258 and is normally urged to the left to rotate the ratchet wheel by a spring 259. The contour of the cam 182 is such that the pawl 253 is drawn to the right during the press operation and is slowly restored to the left during the entire remaining period, that is, during an interval corresponding to at least five received impulses. The slow feeding of the tape renders the movement thereof more even and enables it to be more easily read as it issues from the printer.

*Timing of functions*

Figure 7:
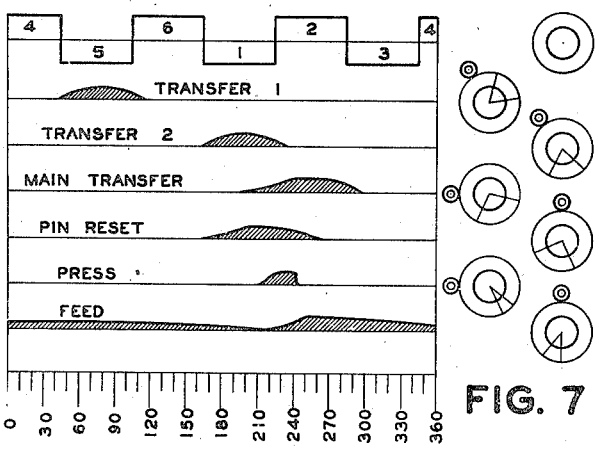
Fig. 7 is a timing diagram for the recorder.

The timing of the various operations of the printer will be best understood by reference to the timing diagram shown in Figure 7. It will be noted from this diagram that the first impulse of a code combination follows immediately after the last or sixth impulse of the preceding combination, the first transfer by which the first three selections are stored in the transfer levers 133 occurring during the fifth impulse. The second transfer by which the selections of impulses 4, 5 and 6 are transferred to the secondary selector levers 133 occurs during the first impulse of the succeeding code. The main transfer by which the code discs are set starts during the first impulse of the succeeding signal group and extends slightly over into the third impulse. Preceding the main transfer slightly the pin resetting operation starts so as to withdraw the previously selected stop bar from the discs so as to unlock them and permit the main transfer to be effected. The main transfer extends beyond the time required to complete the resetting operation, thereby insuring that the discs will be held in a new position until locked in such position by the setting of the new stop bar. The press operation occurs during the resetting operation of the stop bars, that is, while the type wheel is locked stationary by the locking disc 221. The press operation is completed, of course, before the new stop bar has been entirely reset, thereby enabling the type wheel to be released simultaneously with the completion of the resetting operation. The type wheel has the time of approximately five and a half impulses or substantially 90% of each signal period to rotate into printing position and settle down before the press operation. The tape feed starts immediately after the press operation and continues slowly until just preceding the press operation. During the press operation the feed pawl 253 is positioned in the succeeding tooth of the feed ratchet.

It will be noted, therefore, that while the signals are received in continuous succession, each operation of the printer has an abundance of time in which to complete its particular operation. Consequently the printer may be operated at a high speed. Obviously, numerous variations may be made in the construction and the principles herein described may be embodied in various forms of apparatus. Therefore, we do not desire to be limited to the particular construction shown and described but contemplate all variations thereof as will occur to those skilled in the art.

What we claim is:

1. In a selecting mechanism, a plurality of selectable members, an interponent member individual to each selectable member, signal responsive means for positioning said interponent members successively into and out of line with said selectable members, a plurality of cams, means for driving said cams in synchronism with received impulses, said cams being adapted to be brought successively into engagement with said interponent members in synchronism with received impulses to operate the same.

2. In a selector mechanism, a plurality of selector members, a shuttle movable into marking and spacing positions in response to marking and spacing line conditions respectively, a plurality of operating members carried by said shuttle, an individual one of which is adapted to be alined with each of said selector members, when said shuttle is positioned in accordance with one line condition and to be out of alinement therewith when said shuttle is positioned in accordance with the opposite line condition, and means for invariably operating said operating members in succession, said means being driven in synchronism with received line signal conditions whereby to operate said operating members in synchronism with received line conditions to position said selector members in accordance with the received combination of line signal conditions.

3. In a telegraph receiver, a plurality of selector members, a latch member individual to each of said selector members, an interponent member individual to each selector member and means for operating said interponent members in accordance with received line current impulses for operating either said latch members or said selector members.

4. In a telegraph receiver, a plurality of selector members, a latch member individual to each selector member, a shaft movable in rotation only and driven in substantial synchronism with received signal impulses and means movable longitudinally of said shaft in response to line current impulses and means on said shaft for invariably engaging said longitudinally movable means in synchronism with each received impulse for operating either said selector members or their associated latch members.

5. In a telegraph receiver, a selector having a plurality of selectable members, an operating magnet, a rotatable cam shaft, a shuttle interposed between said cam shaft and said selectable members and movable into marking and spacing positions to determine the selective operation of said selector members by said cam shaft, and an escapement mechanism controlled by said magnet for operating said shuttle into marking and spacing positions in accordance with received line current impulses.

6. In a telegraph receiver, a selector having a plurality of selectable members, an operating magnet, a rotatable cam shaft, a shuttle interposed between said cam shaft and said selectable members and movable into marking and spacing positions to determine the selective operation of said selector members by said cam shaft, a power driven shaft, an escapement normally retaining said shaft at rest in one regular position, said escapement being controlled by said magnet to release the shaft for movement into a different angular position upon each reversal of line conditions and an eccentric member on said shaft operatively associated with said shuttle to actuate the same into marking or spacing position depending upon the angular position of said shaft.

7. In a telegraph receiver, a permutation selecting mechanism, a rotary shaft for operating said mechanism, said shaft having no normal stopping position during the reception of successive groups of character selecting conditions and a unison device controlled by predetermined line conditions for arresting said shaft in predetermined angular position.

8. In a telegraph receiver, a selecting mechanism, a rotary shaft for operating said mechanism, said shaft having no normal stopping position during the reception of successive groups of character selecting conditions, a unison device for arresting the shaft in a predetermined angular position and a common magnet responsive to received line current impulses for controlling the selective operation of said selecting mechanism and said unison mechanism, and for maintaining said rotary shaft in synchronism with said impulses.

9. In a telegraph receiver, a selecting mechanism having a rotary shaft, means for maintaining said shaft at rest during inactive signaling periods, means for releasing said shaft for rotation in synchronism with received line impulses upon resumption of signals and means dependent only upon selecting impulses for maintaining said shaft in synchronism with said line impulses during active signal periods.

10. In a telegraph receiver, a group of selectors arranged to be selectively positioned in cyclic order a successive number of times in response to successive groups of character selecting conditions received in continuous succession, a second group of selectors, a third group of selectors, means for transferring the selection from the first selectors to the second group of selectors in a number of time-spaced operations and means for transferring the selection from said second group of selectors to said third group of selectors simultaneously.

11. In a telegraph receiver, a selector operating member, a transfer member, a plurality of first selectors, a plurality of second selectors, a line magnet, interponent members controlled by said magnet adapted to be selectively interposed between said selector operating member and said first selectors to determine the selective operation of said first selectors, said first selectors being arranged to be interposed selectively between said transfer member and said second selectors to determine the selective operation of said second selectors.

12. In a telegraph receiver, a permutation selecting mechanism, a rotary shaft for operating said selecting mechanism, means controlled by line signals for bringing said shaft into correct phase relation with said signals and other means controlled by line signals for maintaining said shaft in correct phase relation.

13. In a synchronous telegraph system, a rotatable selector shaft, having no normal stopping position during reception of successive character signals, a line magnet and solely mechanical means controlled by said line magnet for bringing said shaft into phase relation with received signals.

14. In a synchronous telegraph system, a member movable through a predetermined path in synchronism with received line signals, means for retaining said member at rest when no signals are being received, means acting on reception of signals for starting said member into movement in phase with said signals and means dependent only on selecting impulses for retaining said member in phase with signals received in continuous succession.

15. In a telegraph printer, a selecting mechanism comprising a plurality of notched permutation members selectively positioned in accordance with received signals, a type wheel, means for rotating said type wheel, a stop member for said type wheel, a plurality of stop bars controlled by said notched permutation members to move into the path of said type wheel stopping member, each bar corresponding to a plurality of angular printing positions of said type wheel and means adapted to be set in advance of the stopping of the type wheel for determining in which one of said plurality of positions the type wheel will be stopped.

16. In a telegraph receiver, a selector comprising a plurality of notched permutation disks, an annular group of control bars cooperating with said disks for selection thereby, a type wheel concentric with said group of control bars and having a plurality of angular printing positions greater in number than the number of control bars in said group and means whereby the lesser number of control bars may select any one of said greater number of angular printing positions and means for effecting printing from the selected position.

17. In a telegraph receiver, a selecting mechanism responsive to permutation code signals comprising a plurality of notched code members, a plurality of stop bars selectively positioned by said code members, a type wheel, stop means associated with said type wheel and a selected one of said stop bars to stop the type wheel in one position, said stop arm having two working parts and selection means for effecting the selection of one of said parts for engagement with the selected stop bar.

18. In a telegraph receiver, a type wheel stopping mechanism comprising a plurality of stop arms each corresponding to a different angular stopping position of the type wheel, a plurality of stop bars arranged to be selected by permutation code signals and means for selectively conditioning one of said stop arms for engagement with said selected stop bar.

19. In a telegraph receiver, a type wheel, type wheel positioning mechanism for stopping said type wheel in a predetermined printing position, means for resetting of said type wheel positioning mechanism, and means for retaining said type wheel in its previously stopped position during the resetting of said type wheel positioning mechanism.

20. In a telegraph printer, a plurality of notched code disks, a type wheel, a stop arm for said type wheel, a plurality of stop bars disposed around said code disks, means for positioning said code disks in accordance with received code signals and means for moving the selected stop bars, through the aligned notches of said disks, axially thereof into the path of said stop arm.

21. In a telegraph printer, a plurality of selectors, means for positioning said selectors in accordance with received code signals, a type wheel, a press mechanism therefor, a type wheel positioning mechanism, means for transferring the selection from said selector to said type wheel positioning mechanism, means for positioning said type wheel in the interval between successive transfers and means for operating said press mechanism during each transfer.

22. In a selecting mechanism, a plurality of selectable members, an interponent member individual to each selectable member, signal responsive means for positioning said interponent members successively into and out of line with said selectable members and means driven in substantial synchronism with received line signals for operating said interponent members in synchronism with received line current impulses to selectively position said selectable members in accordance with the received combination of impulses.

23. In a telegraph receiver, a plurality of selector members, a plurality of latch members individual to said selector members, an interponent member individual to each selector member, cam means for moving said interponent members in succession toward said selector and latch members and means responsive to line current impulses for causing said interponent members to engage either said latch members or said selector members.

24. In a telegraph receiver, a plurality of selector members, each of said selector members having a normal and an operated position, a latch member individual to each of said selector members, each of said latch members having an extension for latching its associated selector member when the selector member is moved to its operated position, an interponent member individual to each selector member and its associated latch member and means for moving said interponent members in succession toward said selector and latch members, said interponent members when so moved either actuating said selector members to their operated positions or operating said latch members to restore said selector members to their normal positions, in accordance with received line current impulses.

25. In a telegraph recorder, a plurality of selector members, each of which has a normal and an operated position, a shaft movable in rotation only, means for driving said shaft in synchronism with received signals, means movable longitudinally of said shaft in response to received line current impulses and means on said shaft invariably engaging said longitudinally movable means in synchronism with each received impulse for selectively positioning said selectors in operated position.

26. In a telegraph receiver, a plurality of selector members, a shaft comprising cam members individual to said selector members and arranged about its periphery in angularly and longitudinally spaced relation, said shaft being movable in rotation only and means longitudinally shiftable relative to said shaft in accordance with received line current impulses and invariably engaged by each of said cams in succession for operating said selector members in accordance with the position thereof longitudinally of the shaft.

27. In a telegraph receiver, a plurality of selector members, a shaft comprising cam members individual to said selector members and arranged about its periphery in angularly and longitudinally spaced relation, said shaft being movable in rotation only and a shuttle longitudinally shiftable relative to said shaft in accordance with received line current impulse, said shuttle having an operating member individual to each cam and invariably engaged thereby in either shifted position, each of said operating members operating its associated selector member when engaged by its associated cam in one longitudinal position thereof and missing said selector when engaged by said cam in the other longitudinal position thereof.

28. In a telegraph receiver, a selector mechanism comprising a member movable in rotation only, a second member shiftable linearly between two positions and being engaged by said rotating member in either of said shifted positions to move the same and a selector member in the path of said latter movement when the second member is in one shifted position and out of the path of the second member when it is in its other shifted position.

29. In a telegraph receiver, a selector having a plurality of selectable members, an operating magnet, a rotatable cam shaft, a shuttle interposed between said cam shaft and said selectable members and movable into marking and spacing positions to determine the selective operation of said selector members by said cam shaft, and power means controlled by said magnet in response to received line impulses for positioning said shuttle in marking or spacing position.

30. In a telegraph receiver, a selector having a plurality of selectable members, an operating magnet, a rotatable cam shaft, a shuttle interposed between said cam shaft and said selectable members and movable into marking and spacing positions to determine the selective operation of said selector members by said cam shaft, a rotatable shaft movable into different angular positions under the control of said magnet in response to line impulses, said shaft actuating said shuttle into marking or spacing position depending upon the angular position thereof.

31. In a telegraph receiver, a selector having a plurality of selectable members, an operating magnet, a rotatable cam shaft, a shuttle interposed between said cam shaft and said selectable members and movable into marking and spacing positions to determine the selective operation of said selector members by said cam shaft, a shaft rotatable into different angular positions corresponding to marking and spacing received line current impulses and an eccentric member on said shaft operatively connected to said shuttle to actuate the shuttle into marking or spacing position depending upon the angular position of the shaft.

32. In a telegraph system, a plurality of selectors, an operating magnet, a power-driven shaft normally at rest in one angular position, said shaft being controlled by said magnet for movement into different angular positions upon each reversal of line conditions, a shuttle movable into marking or spacing position depending upon the angular position of said shaft and means invariably engaging said shuttle in each position thereof to selectively operate said selectors.

33. In a telegraph receiver, a plurality of selector members, a cam shaft comprising cam members individual to said selector members and arranged about the periphery of the shaft in angularly and longitudinally spaced relation, said shaft being movable in rotation only, a second shaft normally at rest in one angular position and movable to a different angular position in response to each reversal of line conditions and a shuttle axially shiftable relative to said cam shaft into marking or spacing position in accordance with the angular position of said second shaft, said shuttle having an operating member individual to each cam and invariably engaged thereby in either shifted position, each of said operating members actuating its associated selector member when engaged by its associated cam in one axial position thereof and missing said selector member when engaged by said cam in the other axial position thereof.

34. In a telegraph receiver, a magnet responsive to line current impulses, a shaft operated thereby into marking and spacing positions, a plurality of selector members, a cam shaft rotatable in substantial synchronism with said received line current impulses for operating said selector members, a plurality of interponent members controlled by said first shaft for determining the selective operation of said selector members and a correcting mechanism also controlled by said first shaft for maintaining said cam shaft in synchronism with said received line current impulses.

35. In a telegraph receiver, a magnet responsive to line current impulses, a shaft operated thereby into marking and spacing positions, a plurality of selector members, a cam shaft rotatable in substantial synchronism with said received line current impulses for operating said selector members, a shuttle having a plurality of interponent members for determining the selective operation of said selector members by said cam shaft, an eccentric member on said first shaft for operating said shuttle into marking and spacing positions, and a correcting member on said first shaft cooperating with said cam shaft to maintain the latter in synchronous relation with the received line current impulses.

36. In a telegraph receiver, a permutation selecting mechanism, a rotary shaft for operating said mechanism, said shaft having no normal stopping position during the reception of successive groups of character selecting conditions and means controlled by received line conditions for bringing said shaft to rest and restarting the same in correct phase relation with said signals.

37. In a telegraph receiver, a permutation mechanism, a rotary shaft for operating said mechanism, said shaft having no normal stopping position during the reception of successive groups of character selecting conditions and means operative upon interruption of said character selecting conditions for arresting the rotation of said shaft.

38. In a telegraph receiver, a selecting mechanism, a rotary shaft for operating said mechanism, said shaft having no normal stopping position during the reception of successive groups of character selecting conditions, timing means operable from an initial position through a predetermined cycle and acting at the end of said cycle to arrest the rotation of said shaft and means controlled by received character selecting conditions for restoring said timing means to its initial position.

39. In a telegraph receiver, a selecting mechanism, a rotary shaft for operating said mechanism, said shaft having no normal stopping position during the reception of successive groups of character selecting conditions, means movable by said shaft from an initial position into position to arrest the rotation of the shaft and means acting during normal reception of signals to restore said means to its initial position before it reaches said shaft arresting position.

40. In a telegraph receiver, a permutation selecting mechanism, a rotary shaft for operating said mechanism, said shaft having no normal stopping position during the reception of successive groups of character selecting conditions and means movable into the path of said shaft to arrest the same upon cessation of said signals.

41. In a telegraph receiver, a selecting mechanism, a rotary shaft for operating said mechanism, said shaft having no normal stopping position during the reception of successive groups of character selecting conditions, a worm on said shaft, a member traveling in said worm and adapted to arrest the rotation of the shaft after predetermined travel of said member and means for periodically restoring said member to its initial position in the worm in response to received line current impulses.

42. In a telegraph receiver, a selecting mechanism, a rotary shaft operable in substantial synchronism with received line current impulses for operating said selecting mechanism, a correcting mechanism for said shaft, a unison mechanism therefor, a second shaft controlled by received line current impulses and means on said second shaft for controlling the selective operation of said selecting mechanism and for operating said correcting and unison mechanisms.

43. In a telegraph receiver, a selecting mechanism, a rotary shaft for operating said mechanism, said shaft having no normal stopping position during the reception of successive groups of character selecting conditions, a unison device for arresting the shaft in a predetermined angular position and a single magnet responsive to received line impulses both for controlling said shaft to maintain the same in synchronism with received line impulses and for controlling said unison device to phase said shaft with said received impulses.

44. In a telegraph receiver, a group of selectors arranged to be selectively positioned in cyclic order a successive number of times in response to successive groups of character selecting conditions received in continuous succession, a second group of selectors, a third group of selectors, means for transferring the selection in certain of the selectors of said first group to said second group of selectors before the completion of the selection of the remaining selectors of the first group and means for transferring the selection in the remainder of the first group to said second selectors and transferring the selection in all of the second selectors to the third selectors prior to the succeeding transfer of said certain selectors of the first group to said second selectors.

45. In a telegraph receiver, a group of selectors arranged to be selectively positioned in cyclic order a successive number of times in response to successive groups of character selecting conditions received in continuous succession, a secondary group of selectors, means for operating said secondary group of selectors simultaneously in accordance with the successive positioning of said first selectors, each of said first selectors being released for reselection prior to said transfer.

46. In a telegraph receiver, a group of selectors arranged to be selectively positioned in cyclic order a successive number of times in response to successive groups of character selecting conditions received in continuous succession, a secondary group of selectors, a main transfer mechanism, an intermediate transfer mechanism, said intermediate transfer mechanism receiving the selection on said first selectors successively and said main transfer mechanism receiving the selection from said intermediate transfer mechanism and transferring it to said secondary selectors simultaneously and printing means operable between the completion of successive main transfers.

47. In a telegraph receiver, a selecting cam shaft, a transfer member, a plurality of first selectors, a plurality of second selectors, a line magnet, interponent members controlled by said magnet and adapted to be selectively interposed between said selector cam shaft and said first selectors to determine the selective operation of said first selectors and a second group of interponent elements operated by said selectors and arranged to be interposed between said transfer member and said second selectors to determine the selective operation of said second selectors.

48. In a telegraph receiver, a selecting mechanism, means whereby said selecting mechanism is responsive to permutation signals comprising successive groups of solely character selecting conditions received in continuous succession, a rotatable shaft for said selecting mechanism, a unison mechanism for bringing said shaft into correct phase relation with said signals and a correcting mechanism for maintaining said correct phase relation.

49. In a telegraph receiver, a selecting mechanism, means whereby said selecting mechanism is responsive to permutation signals comprising successive groups of solely character selecting conditions received in continuous succession, a rotatable shaft for said selecting mechanism, a unison mechanism for bringing said shaft into correct phase relation to said signals and means for rotating said shaft in synchronism with received signals.

50. In a synchronous telegraph receiver, a rotary distributor, driving means therefor, a magnet responsive to line current impulses, means for bringing said distributor into phase relation with said line current impulses, and means controlled by said magnet, upon each reversal of line current impulses, for applying a corrective influence directly to said distributor.

51. In a synchronous telegraph receiver, a rotatable shaft having no normal stopping position during continuous reception of successive signal groups, driving means therefor, a magnet responsive to line current impulses, means for starting said shaft into rotation in phase with received signal groups, and means controlled by said magnet for applying a corrective force to said shaft, to maintain the same in correct phase relation to said signals during the reception of successive signal groups.

52. In a synchronous telegraph receiver, a rotatable shaft having no normal stopping position during reception of successive signal groups, means comprising a single electromagnetic device responsive solely to received character selecting line current impulses for bringing said shaft into phase with said signals and maintaining the same in phase therewith during the reception of said signals.

53. In a telegraph receiving mechanism, a rotary member operative in approximate synchronism with received line current impulses, means for holding said rotary member at rest during inactive signalling periods, means for starting said member into rotation in phase with received permutation code signals, and means independent of synchronizing impulses for maintaining said shaft in phase with successive groups of received code signals.

54. In a telegraph receiving mechanism, a rotary member operating in approximate synchronism with received line current impulses, means for holding said rotary member at rest during inactive signalling periods and means controlled by a received code combination of purely selecting impulses for starting said shaft into rotation in phase with received permutation code signals.

55. In a telegraph printer, a selecting mechanism comprising a plurality of notched permutation members selectively positioned in accordance with received signals, a type wheel, means for rotating said type wheel, a stop member for said type wheel, a plurality of stop bars controlled by said notched permutation members to move into the path of said type wheel stopping member, said member being selectively conditioned in accordance with each received signal to vary the stopping position of said type wheel relative to the stop bar.

56. In a telegraph printer, a selecting mechanism comprising a plurality of notched permutation members selectively positioned in accordance with received signals, a type wheel, means for rotating said type wheel, a stop member for said type wheel, a plurality of stop bars controlled by said notched permutation members to move into the path of said type wheel stopping member, each bar corresponding to a plurality of angular printing positions of the type wheel, and means controlled by each received signal for causing said stop bar to stop said type wheel in a selected one of two possible angular positions.

57. In a telegraph receiver, a selector comprising a plurality of notched permutation disks, an annular group of control bars cooperating with said disks for selection thereby, a type wheel concentric with said group of control bars and having a plurality of angular printing positions, each of said control bars corresponding to a plurality of said angular printing positions, means controlled by each signal group for selecting a control bar and other means controlled by each signal group for determining in which angular position the type wheel will be stopped by said control bar.

58. In a telegraph receiver, a selecting mechanism responsive to permutation code signals comprising a plurality of notched code members, a plurality of stop bars selectively positioned by said code members, a type wheel, stop means associated with said type wheel and a selected one of said stop bars to stop the type wheel in one position and selective means for modifying the cooperative relation of said stop means and said selected stop bar, whereby said stop bar is effective to stop the type wheel in a different angular position.

59. In a telegraph receiver, a selecting mechanism responsive to permutation code signals comprising a plurality of notched code members, a plurality of stop bars selectively positioned by said code members, a type wheel, stop means associated with said type wheel and a selected one of said stop bars to stop the type wheel in one position, said stop arm having two working parts and means controlled by one impulse of each code combination for effecting the selection of one of said parts for engagement with the selected stop arm.

60. In a telegraph receiver, a selecting mechanism responsive to permutation code signals comprising a plurality of notched code members, a plurality of stop bars selected thereby, a type wheel, a plurality of stop elements for said type wheel and means responsive to each code combination received to select one of said stop bars and one of said stop elements for engagement, one with the other, whereby to determine the stopping position of the type wheel.

61. In a telegraph receiver, a selecting mechanism responsive to permutation code signals comprising a first group of selectors of a predetermined nature, a second group of selectors of a different nature, means responsive to a certain part of each code group for operating said first selectors in predetermined combinations, means controlled by a different part of the code group for operating said second group of selectors, a type wheel and means controlled jointly by each of said groups of selectors for determining the angular printing position of said type wheel.

62. In a telegraph receiver, a rotatable type wheel, a plurality of stop bars for said type wheel, a selector responsive to permutation code signals for selecting one of said stop bars and means cooperating with said selected stop bar to render it effective to stop the type wheel in any one of a plurality of angular positions.

63. In a telegraph receiver, a type wheel stopping mechanism comprising a fixed stop arm and a movable stop arm, a plurality of stop bars arranged to be selectively positioned in the path of said fixed stop arm in accordance with received code signals and means for moving said movable stop arm into position to engage the selected stop bar, each of said stop arms being effective to stop the type wheel in a different angular position.

64. In a telegraph receiver, a type wheel stopping mechanism comprising a main stop arm, an auxiliary stop arm, a plurality of stop bars arranged to be selected in accordance with received code signals and means for selectively conditioning one of said stop arms for engagement with said selected stop bar.

65. In a telegraph receiver, a type wheel stopping mechanism comprising a stop arm rotatable with said type wheel, a plurality of stop bars arranged to be selectively positioned in the path of said stop arm to stop said type wheel in a definite angular position and an interponent member adapted to be inserted between said stop arm and said selected stop bar to stop said type wheel in a different angular position.

66. In a telegraph receiver, a type wheel stopping mechanism comprising a type wheel shaft, a stop arm fixed longitudinally of said shaft, a second stop arm movable longitudinally of the shaft, both of said stop arms being fixed to rotate with the shaft, a plurality of stop bars arranged concentric with said shaft, means responsive to a permutation code signal for selecting one of said bars for movement into the path of said first stop arm and means responsive to the same signal for moving said second stop arm into or out of position to engage said selected stop bar.

67. In a telegraph receiver, a type wheel, type wheel positioning mechanism for stopping said type wheel in a predetermined printing position, means for resetting said type wheel positioning mechanism, and means, independent of said type wheel positioning mechanism for retaining said type wheel in its previous position of rest during the resetting of said type wheel positioning mechanism.

68. In a telegraph receiver, a type wheel, type wheel positioning mechanism for stopping said type wheel in a predetermined printing position, means for resetting said type wheel positioning mechanism and means for retaining said type wheel in its arrested position and taking an impression therefrom, during the resetting of said type wheel positioning mechanism.

69. In a telegraph printer, a selecting mechanism having a plurality of selecting elements, said selecting mechanism being responsive to received permutation code signals, to position said selecting elements in accordance with the received combination of line current impulses, a type wheel, a type wheel positioning mechanism, means for transferring the selection set up in said selecting elements to said type wheel positioning mechanism and means for locking said type wheel against movement during said transfer operation.

70. In a telegraph printer, a selector mechanism responsive to permutation code signals, a plurality of notched code members selectively positioned by said selector mechanism, a type wheel, a plurality of stop members selectable by engagement with said notched code members, to move into position to stop said type wheel, means for retracting said selected stop members during the repositioning of said notched members, and means for retaining said type wheel at rest until the succeeding stop bar has been selected by said notched code members and moved into position to stop the type wheel.

71. In a telegraph printer, a selector mechanism responsive to permutation code signals, a plurality of notched code disks selectively positioned by said selector mechanism, a type wheel, driving means for said type wheel, a plurality of stop bars disposed about said code disks and selectively movable into aligned notches of said disks to stop said type wheel, means for moving said selected stop bar out of the aligned notches of the disks to permit shifting of said disks to select a different stop bar, and subsequently to permit the newly selected stop bar to move into the aligned notches of the disk and means for locking the type wheel against movement during the movement of one stop bar out of type wheel stopping position and the movement of the succeeding bar into type wheel stopping position.

72. In a telegraph printer, a selecting mechanism having a plurality of selecting elements, said selecting mechanism being responsive to received permutation code signals, to position said selecting elements in accordance with a received combination of line current impulses, a type wheel, a type wheel positioning mechanism, means for transferring the selection set up in each selecting element to said type wheel positions mechanism and means for taking an impression from the type wheel during said transfer operation.

73. In a telegraph printer, a plurality of notched code disks, a type wheel, a stop arm for said type wheel, a plurality of stop bars disposed around said code disks, means for positioning said code disks in accordance with received code signals and means for moving the selected stop bars, through the aligned notches of said disks, axially thereof, into and out of type wheel stopping position and means for locking said type wheel at rest during said movement.

74. In a telegraph printer, a plurality of notched code disks, a type wheel, a stop arm for said type wheel, a plurality of stop bars disposed about said code disks, means for positioning said disks in accordance with received code signals and means for moving the selected stop bar through the aligned notches of said disks, axially thereof, into and out of type wheel stopping position and means for retaining said type wheel at rest during the movement of said selected stop bar out of type wheel stopping position.

75. In a telegraph printer, a selector responsive to a series of permutation signals in which the interval between the last impulse of one signal and the first impulse of the next signal is the same as the interval between succeeding impulses of the same signal, a type wheel, a type wheel stopping mechanism operated periodically by said selector to change the stopping position of the type wheel and means for rotating the type wheel to printing position during up to at least eighty percent of said period.

76. In a telegraph receiver, a group of selectors, means for selectively positioning said selectors in cyclic order a successive number of times in response to successive groups of character selecting conditions received in continuous succession, a secondary group of selectors and means for operating said secondary group of selectors simultaneously in accordance with the successive positioning of said first selectors.

77. In a telegraph receiver, a plurality of selectors, means for selectively operating said selectors in response to received code signals, a member pivotally secured to each of said selectors, a plurality of permutation members and means operative following the selective operation of said selectors for actuating the members of selected selectors to control the operation of said permutation members.

78. In a telegraph receiver, a plurality of pivoted selectors, means for selectively operating said selectors in response to received code signals, a member pivotally secured to each of said selectors, and movable therewith, a plurality of notched permutation members and cam means operative following the selective operation of said selectors for actuating the members of selected selectors to control the operation of said notched permutation members.

79. In a telegraph receiver, a plurality of selectors, means for selectively operating said selectors in response to received code signals, a member pivotally secured to each of said selectors, a plurality of permutation members, a plurality of intermediate members, means operative following the selective operation of said selectors for actuating the pivoted members of selected selectors whereby to actuate said intermediate members, said intermediate members being operatively associated with said permutation members to control the operation thereof.

80. In a telegraph receiver, a plurality of selectors, means for selectively operating said selectors in response to received code signals, a member pivotally secured to each of said selectors, a plurality of permutation members, a plurality of intermediate members, means operative following the selective operation of said selectors for actuating the pivoted members of selected selectors whereby to actuate said intermediate members, said intermediate members being operatively associated with said permutation members to control the operation thereof and means for restoring said permutation members to a normal position following each selective operation thereof.

81. In a telegraph receiver, a plurality of selectors, means for selectively operating said selectors into selected position in response to received code signals, a finger pivotally secured to each of said selectors, a plurality of permutation members, an operating member common to said fingers and arranged to engage said fingers in the selected position of said selectors and means for operating said member following the selective operation of said selectors for actuating the fingers of selected selectors, to control the operation of said permutation members.

82. In a telegraph receiver, a plurality of selectors, means for selectively operating said selectors into selected position in response to received code signals, a finger pivotally secured to each of said selectors, a plurality of permutation members, an operating member common to said fingers and arranged to engage said fingers in the selected position of said selectors, cam means operating in timed relation to the selector operating means for operating said member, to actuate the fingers of selected selectors to control the operation of said permutation members.

ROBERT F. DIRKES.
EVAN R. WHEELER.
VERNON R. KIMBALL.